United States Patent [19]

Erickson et al.

[11] 4,226,752

[45] Oct. 7, 1980

[54] EMULSION PROCESS FOR POLYMER PARTICLES

[75] Inventors: James R. Erickson, Brunswick; Robert J. Seidewand, Olmsted Falls, both of Ohio

[73] Assignee: SCM Corporation, New York, N.Y.

[21] Appl. No.: 24,878

[22] Filed: Mar. 28, 1979

Related U.S. Application Data

[63] Continuation-in-part of Ser. No. 837,390, Sep. 28, 1977, abandoned.

[51] Int. Cl.$^2$ .................. C08L 31/04; C08L 33/08; C08L 25/04; C08F 2/26; C08F 2/30
[52] U.S. Cl. .................. 260/29.6 RB; 260/29.6 RW; 260/29.6 PT; 260/29.6 PM; 525/301; 525/302; 525/308; 525/309; 525/311

[58] Field of Search .............. 260/886, 885, 29.6 RW, 260/29.6 RB, 29.6 PT, 29.6 PM

[56] References Cited

U.S. PATENT DOCUMENTS

| | | | |
|---|---|---|---|
| 3,423,351 | 1/1969 | Pierce et al. | 526/909 |
| 3,426,101 | 2/1969 | Ryan et al. | 260/876 |
| 3,657,172 | 4/1972 | Gallagher et al. | 260/29.6 RB |

Primary Examiner—Carman J. Seccuro
Attorney, Agent, or Firm—Thomas M. Schmitz

[57] ABSTRACT

An improved two-step process for producing large size emulsion polymer particles includes the steps of providing uniform size polymer particles in the first stage followed by a controlled second stage monomer polymerization which overcomes stability problems in large size composite emulsion polymer particle systems, and is particularly useful in coatings, adhesives, and plastics.

10 Claims, 3 Drawing Figures 4,226,752

EMULSION PROCESS FOR POLYMER PARTICLES

EMULSION PROCESS FOR POLYMER PARTICLES

This is a continuation-in-part of patent application Ser. No. 837,390 filed Sept. 28, 1977, now abandoned, and the same is incorporated herein by reference.

BACKGROUND OF THE INVENTION

The present invention pertains to a process for synthesizing large size uniform emulsion polymer particles made from polymeric seeds onto which is added monomer polymerized in a second stage. The resultant large polymer particles may be homogeneous but normally will be of a heterogeneous nature and are particularly useful for providing improved physical properties in coatings, plastics, and adhesives. Core/shell particles can be effectively produced. Heterogeneous core/shell polymer particles wherein the core can be a rigid polymer having a high Tg relative to a resilient elastomeric shell having a lower Tg can be conveniently produced in large size without experiencing emulsion instability.

Although seeded emulsion polymerization processes and particles have been suggested in the past, in such processes said particle surface coverage by the surfactants must be less than 100% surface coverage or less than critical-micelle-concentration (CMC). However, too little surfactant or considerably less than 100% surface coverage of the polymer seed particles introduces stability problems and produces considerable excessive coagulation. For example, U.S. Pat. No. 3,657,172 and U.S. Pat. No. 3,426,101 specifically provide for high surface tension in second stage processing as well as maintaining the concentration of surfactant well below the critical-micelle-concentration (CMC) to avoid 100% surfactant coverage of the seed. More specifically, U.S. Pat. No. 3,397,165 proposes that the core surfactant surface coverage be maintained below 70% theoretical surface coverage in the second monomer addition.

It now has been found that the second stage monomer addition can be carefully controlled wherein substantially all of the second stage monomer addition effectively adds to the seed particles whereby the seed particle can be substantially increased due to utilizing excess surfactant beyond CMC or at least about 105% seed surface coverage. The second stage monomer addition can be accurately controlled in accordance with the process of this invention by using a certain balance of non-ionic surfactant and anionic surfactant at a combined surfactant coverage of between about 105% and 1000% of the polymer seed surface to provide a grown composite particle where the second stage monomer has polymerized and completely associated itself with the first stage seed particle. The process further provides a method of controlling the surfactant in the second stage monomer polymerization wherein the balanced combination of surfactants provides at least about 105% seed surface coverage and preferably between 105% and 500% seed surface coverage.

Accordingly, a primary object of this invention is to provide a process for producing stabilized large size emulsion particles formed by polymerizing all of the second stage monomer addition onto the polymer seed in the presence of a controlled combination of non-ionic and anionic surfactants. A further object is to provide a process for controlling the level of second generation new particles and provide a stabilized interdispersion of heterogeneous composite particles or core/shell particles in combination with a predetermined level of new generation particles achieved by controlling the levels of total surfactant above 105% seed surface coverage as well as controlling the balance ratio of non-ionic to anionic surfactants.

These and other advantages will become more apparent by referring to the drawings and detailed description of this invention.

SUMMARY OF THE INVENTION

The process of this invention comprises the steps of first providing substantially monodispersed polymeric seed particles in a polymerization process followed by a second stage monomer polymerization after adjustment of the seed surface coverage to a level between 105% and 1000% seed surface coverage using a controlled balance ratio of non-ionic surfactant to anionic surfactants.

IN THE DRAWINGS

FIG. 1 is a graph of percent by weight of non-ionic surfactant "N" vs. percent seed surfactant surface coverage "S" indicating by contour lines the weight fraction "y" of second stage monomer added to the first generation polymer seed;

FIG. 2 is a graph derived from FIG. 1 wherein the composite particle comprised by weight 35% seed polymer and 65% second stage polymer at a $(D_p/D_i)^2 = 2.01$ wherein the contour lines indicate the weight fraction "y" of second stage monomer added to the first stage seed; and FIG. 3 is also a graph derived from FIG. 1 wherein the composite particle is comprised by weight 50% seed polymer and 50% second stage polymer at $(D_p/D_i)^2 = 1.59$ wherein the contour lines have the same meaning. $D_p$ is the projected diameter of the composite particle and $D_i$ is the diameter of initial seed polymer particle.

DETAILED DESCRIPTION OF THE INVENTION

Figure 1:
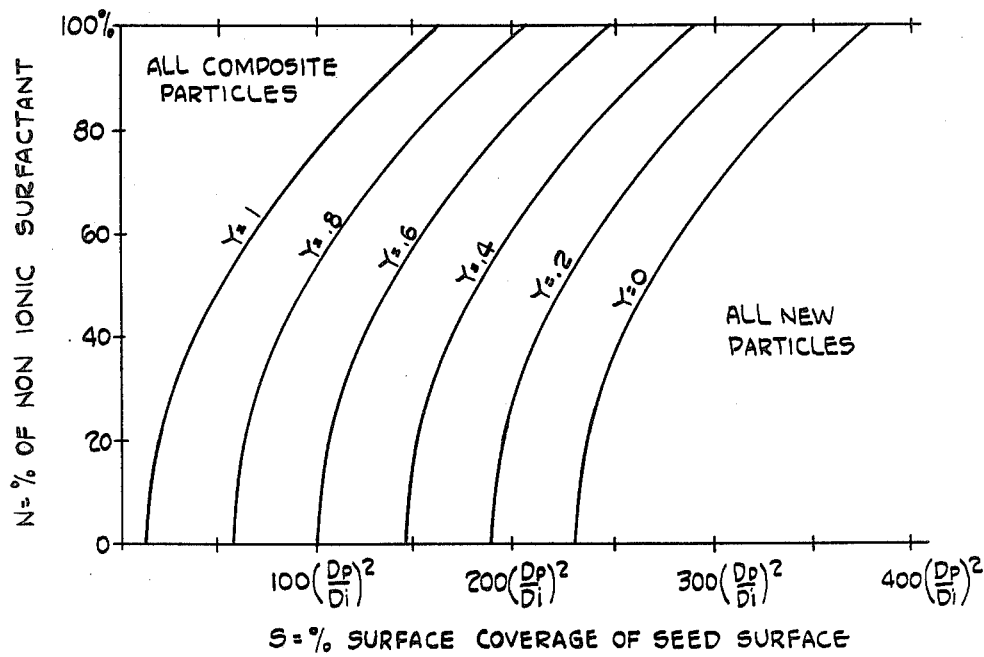

The process of this invention pertains to a method of controlling the second stage polymer development wherein second stage monomer selectively associates with first stage polymer seed particles to form composite polymer particles and/or forms distinct new second stage particles to provide an in-situ latex blend of composite particles and second stage polymer particles.

The controlled second stage process of this invention is particularly effective if the first stage polymer seed particles are substantially uniform size polymer particles. The uniform seed particles are thereafter utilized in a second stage seeded polymerization process wherein second stage monomer either adds completely onto pre-existing latex polymer seed particles or simultaneously produces second generation new particles to form an in-situ blend. The suppressing or promotion of second generation new polymer particles is achieved in accordance with this invention by controlling the second stage total surfactant coverage above about 105% polymer seed surface coverage and by particularly controlling the weight fraction of non-ionic surfactant at greater than 30% of the total surfactant comprising non-ionic and anionic surfactants. Preferably, the non-ionic surfactant comprises between 30% and 98% of the total second stage surfactant which in turn provides between about 105% and 1000% theoretical polymer seed surface coverage. The second stage seeded polymerization process includes preformed seed latex, water medium, minor additives like chain transfer agents and buffers, second stage monomers, initiators, electrolyte, and surfactant as hereinafter described.

Referring first to the first stage of the process of this invention, substantially uniform polymer particle seeds are synthesized by an emulsion polymerization process to produce an aqueous dispersion of monodisperse polymer particles having substantially a uniform particle size or diameter. An advantage of uniform first stage seeds is that the amount of second stage monomer addition to the seed is uniform among all the individual seed particles to produce uniform composite latex particles. The size can be determined by disc centrifuge or electron microscopy. Since both the seed and the composite particles are uniform in size, simple size comparisons provide accurate information on second stage addition or seed growth. This allows for quality control and the change to make necessary alterations to achieve desired uniform mass production of the latex. In the particular use of core/shell composite particles, uniform seeds and, consequently, uniform core/shell particles provide uniform spacing of the cores within coatings, adhesives, and plastics where the latex polymer is the main polymeric ingredient. This provides better flexibility-hardness balance.

Substantially uniform particle seeds can be produced in accordance with U.S. Pat. No. 3,423,351 by an emulsion process of polymerizing monomers having carbon-to-carbon unsaturation. Suitable seed polymers include for example, homopolymers or copolymers of any of the monomers having at least one ethylenically unsaturated group which are well known to those skilled in the art to undergo addition polymerization under the conditions of emulsion polymerization in aqueous medium. Among these as illustrative examples are 1,3-butadiene, 2-methyl-1,3-butadiene, 2,3-dimethyl-1,3-butadiene, allylbenzene, diacetone acrylamide, vinylnaphthalene, chlorostyrene, 4-vinyl benzyl alcohol, vinyl benzoate, vinyl propionate, vinyl caproate, vinyl chloride, vinyl oleate, dimethyl maleate, maleic anhydride, dimethyl fumarate, vinyl sulfonic acid, vinyl sulfonamide, and methyl vinyl sulfonate. Particularly preferred monomers include for example, N-vinyl pyrolidone, vinyl pyridine, styrene, alpha-methyl styrene, tertiary butyl styrene, vinyl toluene, divinyl benzene, vinyl acetate, vinyl versatate, alkyl acrylates and methacrylates such as ethyl acrylate, butyl acrylate, 1,6-hexanediol diacrylate, ethylthioethyl methacrylate, methyl acrylate, isobornyl acrylate, 2-hydroxyethyl acrylate, 2-phenoxyethyl acrylate, glycidyl acrylate, 2-ethylhexyl acrylate, neopentyl glycol diacrylate, 2-ethoxyethyl acrylate, t-butylaminoethyl methacrylate, 2-methoxyethyl acrylate, methyl methacrylate, glycidyl methacrylate, benzyl methacrylate, ethyl methacrylate, acrylic acid, methacrylic acid, N-methyl methacrylamide, acrylonitrile, methalcrylonitrile, acrylamide, N-(isobutoxymethyl)acrylamide, and the like. The preformed polymer seed particles are substantially monodispersed or uniform in size and this can be measured by a Joyce Loebl Disc Centrifuge using a procedure described by Provder and Holsworth in American Chemical Society Coatings and Plastics Preprints, 36,150, (1976). The diameter of the polymer particle seeds can also be determined by electron-microscopy techniques in accordance with the procedure described by S. H. Maron in the "Journal of Applied Physics", Vol. 23, page 900, August, 1952. In determining the uniformity of particle diameter or monodispersity, the average weight diameter ($D_w$) is divided by the average number diameter ($D_n$) wherein the $D_w/D_n$ theoretically approaches 1.0 and preferably is within the range of 1.0 to 1.04 in accordance with this invention. $D_w$ is the polymer particle weight average diameter and $D_n$ is the polymer particle number average diameter. The values $D_w$ and $D_n$ can be determined in accordance with the procedures described by Loranger, et al, in the "Official Digest", Vol. 31, pages 482–520, particularly pages 491-2 (1959). Preferably, the seed weight average particle diameter $D_w$ is between about 500 Å and about 8000 Å as well as the monodispersity $D_w/D_n$ ratio being broadly between 1.0 and 1.1 and preferably between about 1.0 and 1.04.

In accordance with this invention, a seed growth of finite amount can be achieved by providing a certain combination of non-ionic and anionic surfactants in the second stage monomer addition to form an enlarged latex particle from polymers and copolymers of ethylenically unsaturated vinyl monomers such as 1,3-butadiene, 2-methyl-1,3-butadiene, 2,3-dimethyl-1,3-butadiene, allylbenzene, diacetone acrylamide, vinylnapthalene, chlorostyrene, 4-vinyl benzyl alcohol, vinyl benzoate, vinyl propionate, vinyl caproate, vinyl chloride, vinyl oleate, dimethyl maleate, maleic anhydride, dimethyl fumarate, vinyl sulfonic acid, vinyl sulfonamide, methyl vinyl sulfonate, and preferably N-vinyl pyrolidone, vinyl pyridine, styrene, alpha-methyl styrene, tertiary butyl styrene, vinyl toluene, divinyl benzene, vinyl acetate, vinyl versatate, alkyl acrylates and methacrylates such as ethyl acrylate, butyl acrylate, 1,6-hexanediol diacrylate, ethylthioethyl methacrylate, methyl acrylate, isobornyl acrylate, 2-hydroxyethyl acrylate, 2-phenoxyethyl acrylate, glycidyl acrylate, 2-ethylhexyl acrylate, neopentyl glycol diacrylate, 2-ethoxyethyl acrylate, t-butylaminoethyl methacrylate, 2-methoxyethyl acrylate, methyl methacrylate, glycidyl methacrylate, benzyl methacrylate, ethyl methacrylate, acrylic acid, methacrylic acid, N-methyl methacrylamide, acrylonitrile, methalcrylonitrile, acrylamide, N-(isobutoxymethyl)acrylamide, and the like. The second stage addition of ethylenically unsaturated monomers can be added to the aqueous solution containing the preformed monodisperse polymer seeds along with surfactants and polymerizing catalysts or initiators and other minor ingredients. The amount of second stage monomer is broadly between 5 and 95 and preferably between 20 and 80 weight percent of the total of the seed polymer and the second stage monomer. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyonitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron(II) sulfate, etc. The polymerization initiators are usually added in amounts between about 0.1 to 2 weight percent based on the monomer addition.

The process of this invention is dependent considerably upon the balance of non-ionic and anionic surfactant which controls the amount of available monomer which will add to the preformed polymer particle seeds. The relationship of surfactants depends upon (N) the weight percent of non-ionic surfactant as well as the (S) the seed latex surface coverage. The surface coverage (S) of the polymer seed particle is at least about 105% and advantageously between 105% and 1000%, and preferably between 105% and 500%. The surface coverage is dependent upon a certain finite concentration of surfactant referred to as critical-micelle-concentration (CMC) wherein the CMC point is theoretically 100% surfactant surface coverage of the seed particle whereupon additional soap produces very little change in surface tension and theoretically no further soap can be absorbed or accommodated as a monolayer by the latex polymer surface.

Broadly, the fraction of new particles formed in the second stage polymerization is inverse to the fraction of non-ionic surfactant and the relative amount of second stage monomer, but is proportioned to the seed surfactant surface coverage. This behavior is depicted in FIG. 1: Entirely composite particles (like core/shell) can be produced by controlled use of non-ionic and anionic surfactant mixtures. The higher above 105% seed surfactant surface coverage used, the greater the percentage of the surfactant must be non-ionic. Further, the greater the amount of next stage monomer which is used relative to the seed particles, the greater the total seed surface coverage (S) can be used at any given percentage non-ionic. This is expressed by the multiplying factor $(D_p/D_i)^2$ where $D_p$ is the diameter of the final composite particle (assuming for calculation purposes no new particle formation) and $D_i$ is the diameter of the seed particles. All new particles can be produced to obtain an in-situ blend of seed and new particles by decreasing the percentage of non-ionic surfactant and increasing the seed surface coverage. This is aided by decreasing the relative amount of monomer being used in the next stage relative to the seed particles. Partial addition of the polymerizing monomer to form enlarged composite particles and partially new particles is obtained by selecting percentages of the seed surface coverage and the percentage non-ionic surfactant to be between the extreme values of these variables used to obtain entirely composite particles or entirely new particles. In the case of the continuous incremented addition of the second stage monomer to seed particles, the instantaneous $(D_p/D_i)^2$ is virtually equal to one, and it is assumed for calculation purposes that all the monomer already fed has been fully polymerized and added to the seed.

The exact contours for any particle figure like FIG. 1 are obtained by mapping out the N,S area for a particular type of seed and type of second stage composition by making experimental latexes at well spaced N,S and $(D_p/D_i)^2$ values. FIG. 1 gives the experimentally determined contours for a polystyrene seed and second stage styrene-acrylic or all acrylic copolymer. FIG. 1 is also experimentally accurate for the other compositions illustrated in the examples.

Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols, etc. Preferred anionic surfactants include for example, alkylbenzene sulfonate salts such as sodium dodecylbenzene sulfonate and salts of hexyl, octyl, and higher alkyl diesters of 2-sulfosuccinic acid, etc. Suitable non-ionic surfactants include polyoxyethylene glycols reacted to a lyophilic compound to produce a hydrophile-lyophile balance (HLB) greater than 2 and preferably between about 10 and 15 as set forth in U.S. Pat. No. 3,423,351. Suitable non-ionic surfactants include for example, ethylene oxide condensation products reacted with t-octylphenol or nonylphenol and known as "Triton" surfactants, polymerized oxyethylene (IgepalCA), ethylene oxide reacted with organic acid (Emulfor), or organic acid reacted with polyoxyamylene ether of stearic or oleic acid esters (Tweens).

In accordance with this invention, the uniform size polymer particle seeds were dispersed in an aqueous medium containing certain surfactants and the second stage monomer added and reacted in a temperature range of about 50°–80° C. for about 4–16 hours. The water amount was fixed at between about 30%–70% level and preferably at the 50% level based on particle seed and second stage monomer whereby the resulting composite latex would be approximately a 50% by weight latex. The second stage polymerization process of providing growth of the seed to composite particles will become more apparent by referring to the following illustrative examples.

EXAMPLE 1

The following were reacted in accordance with the procedure set forth in U.S. Pat. No. 3,423,351 to produce a 5-gallon reactor batch of uniform size polymer seed particles.

| | |
|---|---|
| 9.0 | grams anionic sodium dodecyl benzene sulfonate (Siponate DS-10; 95.4% active) |
| 233.8 | grams non-ionic arylalkyl ether alcohol (Triton X-100; 98.4% active) |
| 778.0 | grams 0.1 Molar sodium hydroxide |
| 405.1 | grams of 3% by weight water solution of $K_2S_2O_8$ |
| 8617.7 | grams of de-ionized water |
| 6757.9 | grams Styrene |
| 16,801.5 | grams total charge |

About half of the water was charged to the reactor followed by the Siponate DS-10, the Triton X-100, and the NaOH. The mixture was then stirred and sparged with $N_2$ for about 45 minutes. The 3% $K_2S_2O_8$ water was then added with the remainder of the water. The styrene was thereafter added to the mixture in the reactor while agitating to emulsify the solution mixture followed by upheating the mixture to about 65° C. The reaction mixture was maintained at about 65° C. for about 16 hours while agitating for complete conversion of the styrene into polystyrene seed particles. The seed particles had an average particle diameter of about 2464 Å as measured by disc centrifuge; a density of about 1.057; and the latex had a non-volatile (NVM) of 41%, and the seed particles were monodisperse. The seed surface coverage was 100%. Percent surface coverage is calculated from direct tritration of the latex by a mixture of the two surfactants to obtain the CMC. This procedure is basically described by Maron in "Journal of Colloid Science," 9, 89–103 (1954), and Abbey, Erickson, and Seidewand in "Journal of Colloid and Interface Science," 66,1, 203–204 (1978).

EXAMPLE 2

The following materials were added to a 5-liter reactor and agitated while sparging with $N_2$.

1096.2 grams de-ionized water
2.16 grams Siponate DS-10 (95.4% active)
38.88 grams Triton X-100
1.89 grams $K_2S_2O_8$ After the foregoing was dissolved in water, the following was emulsified therein.

1350.0 grams of the seed latex of Example 1
706.05 grams n-butyl acrylate
282.15 grams Styrene
20.25 grams methacrylic acid The mixture was then upheated to 65° C. and maintained at 65° C. for about 12 hours with agitation to completely polymerize the second stage monomer.

Figure 2:
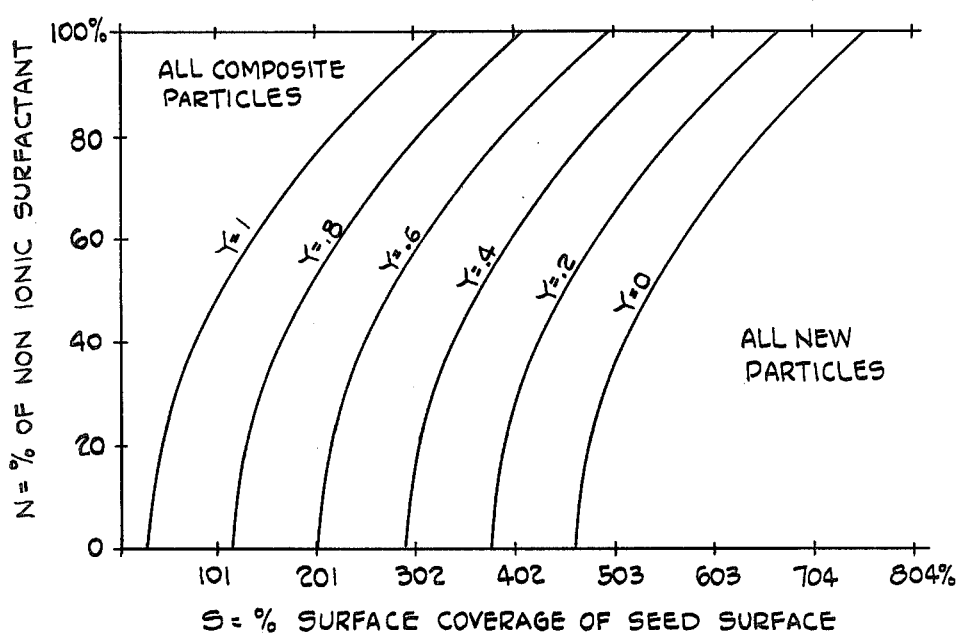

The addition of the seed latex from Example 1 to the solution of the surfactants caused the seed surface coverage to jump from 100% to 314% and the N became 95%. The addition of the shown monomers gave the calculated $(D_p/D_i)^2$ a value of 2.01. The $D_p$ is calculated from the relative weights and densities of the seed and the second stage monomers. The density of the second stage monomer used is that after polymerization. The combination of N, S, and $(D_p/D_i)^2$ used was selected to induce all the second stage monomer to add to the seed to give entirely composite particles as required by FIG. 2. Examination of the latex of Example 2 by disc centrifuge according to the method described by Seidewand and Erickson in "Polymer Engineering and Science", 18, 15, 1182–1185 (1978), showed that all the second stage monomer added to seed to produce composite particles. The latex was clean and stable.

EXAMPLE 3

The following materials were added to a 12-ounce bottle reactor:

85.12 grams de-ionized water
0.52 grams Siponate DS-10 (95.4% active)
5.72 grams Triton X-100
0.14 grams $K_2S_2O_8$ After the foregoing was dissolved in water, the following was emulsified therein:

100.00 grams of the seed latex of Example 1
52.30 grams of n-butyl acrylate
20.90 grams styrene
1.50 grams methacrylic acid The mixture was then upheated to 65° C. and maintained at 65° C. with rolling for 16 hours to completely polymerize the second stage monomer. The addition of the seed latex from Example 1 to the solution of surfactants caused the seed surface coverage to jump to 543% with an N equal to 93%. The calculated $(D_p/D_i)^2$ value for the latex of Example 3 was 2.01. The N, S, and $(D_p/D_i)^2$ selected was to obtain a latex exhibiting partial seed growth and partial new particle generation. From disc centrifuge analysis it was determined that the weight fraction, y, of second stage monomer that added to seed was 0.3 as predicted by FIG. 2. The latex was clean and stable.

EXAMPLE 4

Figure 3:
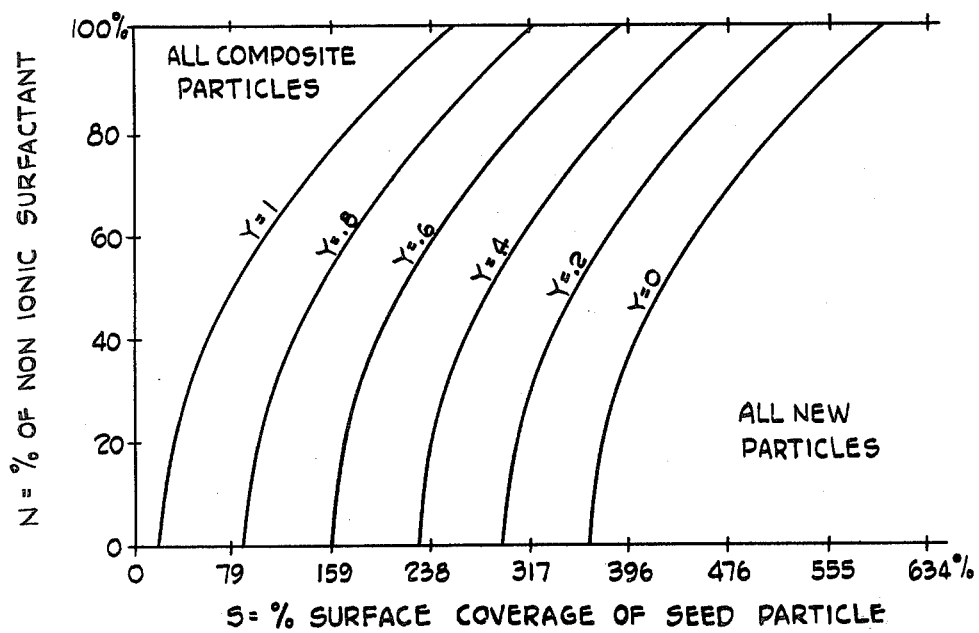

The following materials were added to a 5-liter reactor:

741.2 grams de-ionized water
6.08 grams Siponate DS-10 (95.4% active)
0.27 grams Triton X-100
1.89 grams $K_2S_2O_8$ After the foregoing was dissolved in water, the following was emulsified therein:

1971.0 grams of the seed latex of Example 1
673.6 grams n-butyl acrylate
102.6 grams styrene
16.2 grams methacrylic acid The mixture was then upheated to 65° C. and maintained at 65° C. while agitating for 14 hours to completely polymerize the second stage monomer. The surfactant surface coverage on the seed was 144%, N was 74%, and $(D_p/D_i)^2$ was 1.59. These values were selected to produce entirely composite particles, i.e. y=1 as predicted by FIG. 3. The latex was clean and stable and the disc centrifuge analysis showed y=1.

EXAMPLE 5

The following materials were added to a 12-ounce bottle reactor:

65.60 grams de-ionized water
0.82 grams Siponate DS-10 (95.4% active)
9.04 grams Triton X-100
0.14 grams $K_2S_2O_8$ After the foregoing was dissolved in water, the following was emulsified therein.

146.00 grams of the seed of Example 1
49.90 grams of n-butyl acrylate
7.60 grams styrene
1.20 grams methacrylic acid The mixture was then upheated to 65° C. and maintained at 65° C. while rolling for 16 hours to completely polymerize the second stage monomer. S was 577%, N was 93%, and $(D_p/D_i)^2$ was 1.59. These values were selected to produce only new particles. See FIG. 3. The latex was clean and stable. Disc centrifuge analysis showed that y=0, meaning that only new particles formed as predicted.

EXAMPLE 6

The following components were reacted to form a uniform sized seed latex:

| | |
|---|---|
| 12.9 | grams Siponate DS-10 (91.1% active) |
| 256.9 | grams Triton X-100 |
| 552.2 | grams 0.1 molar sodium hydroxide |
| 7.6 | grams potassium persulfate ($K_2S_2O_8$) |
| 8377.1 | grams de-ionized water |
| 7507.5 | grams styrene |
| 16,714.2 | grams total charge |

All of the ingredients except the $K_2S_2O_8$ and enough water to make a 5% aqueous solution of the $K_2S_2O_8$ were added to a 5-gallon reactor, stirred and sparged with $N_2$ gas for 10 minutes. The sparge was removed and the mixture heated to 65° C. The 5% solution of $K_2S_2O_8$ was added. The reaction mixture was maintained at 65°–67° C. After the reaction exotherm subsided (approximately 90–95% conversion) the batch was heated to 90°–92° C. and held for 3 hours assuring high conversion. The seed particles had a density of 1.056 gram per cm$^3$. The NVM was 45.6%. The average particle diameter measured by disc centrifuge was 2461 Å and $D_w/D_n$ was 1.02. This seed particle was used in second stage processing according to Examples 2–5 and illustrated in Table I of Example 10.

EXAMPLE 7

The following components were reacted to give a uniform sized seed latex:

| | |
|---|---|
| 1.70 | grams Siponate DS-10 (94.1% active) |
| 34.00 | grams Triton X-100 |
| 2266.61 | grams de-ionized water |
| 1.70 | grams NaHCO$_3$ |
| 11.90 | grams acrylamide |
| 3.40 | grams K$_2$S$_2$O$_8$ |
| 1700.00 | grams styrene |
| 3.40 | grams dodecyl mercaptan (DDM) |
| 4022.71 | grams total charge |

The first 5 ingredients were charged to a 5-liter reactor, stirred and heated to 72° C. while purging with $N_2$ gas, then a $N_2$ atmosphere was maintained. The $K_2S_2O_8$ was added, followed by 27% of the styrene-DDM mixture. The reaction mixture was maintained at 72°–73° C. for approximately 1 & ½ hours. The addition of the remainder of styrene-DDM mixture was started and continued for 4 hours while maintaining the reaction mixture at 72°–75° C. The batch was then held for approximately 2 hours at 80°–85° C. to complete the polymerization. The NVM was 42.5%; particle density was 1.058; the average particle diameter was 2430 Å. The seed particles were used in second stage processing as further illustrated in Table I in Example 10.

EXAMPLE 8

The following components were reacted according to the procedure of Example 7 to give a uniform sized seed latex.

| | |
|---|---|
| 0.68 | grams Siponate DS-10 (94.1% active) |
| 34.00 | grams Triton X-100 |
| 2266.61 | grams de-ionized water |
| 1.70 | grams NaHCO$_3$ |
| 11.90 | grams acrylamide |
| 3.40 | grams K$_2$S$_2$O$_8$ |
| 1700.00 | grams styrene |
| 3.40 | grams dodecyl mercaptan |
| 11.33 | grams 3% aqueous K$_2$S$_2$O$_8$ |
| 4033.02 | grams total charge |

The final addition of $K_2S_2O_8$ solution was followed by an additional 2-hour hold to further assure complete conversion. The NVM was 43.5%; particle density was 1.058; the average particle diameter was 3890 Å. The seed particles were utilized in second stage processing as illustrated in Table I in Example 10.

EXAMPLE 9

The following components were loaded into a 12-ounce bottle reactor and polymerized for 17 hours at 65° C.

| | |
|---|---|
| 142.61 | grams de-ionized water |
| 0.39 | grams K$_2$S$_2$O$_8$ |
| 51.05 | grams methyl methacrylate |
| 25.95 | grams ethyl acrylate |
| 220.00 | grams total charge |

After filtering, the NVM was 33.7%; dark field microscopy at 400X revealed the sample was monodisperse. Particle density was 1.184; JLDC average particle diameter was 7454 Å; $D_w/D_n$ was 1.03. These seed particles were utilized in second stage processing as illustrated in Table I.

EXAMPLE 10

The following examples, 10 through 20, were prepared similarly to Examples 2–5 by utilizing the polymer seed particles prepared in Examples 6–9.

TABLE I (a)

| Example | 10 | 11 | 12 |
|---|---|---|---|
| Seed of example | 6 | 6 | 6 |
| Ingredients: | | | |
| Seed | 367.18 | 419.63 | 419.71 |
| K$_2$S$_2$O$_8$ | — | 0.43 | 0.43 |
| Azobisisobutyronitrile | 0.38 | — | — |
| De-ionized Water | 129.18 | 191.29 | 192.97 |
| Siponate DS-10 (91.1% active) | 0.68 | 0.80 | 1.29 |
| Triton X-100 | 1.80 | 2.14 | 0.83 |
| Methyl Methacrylate | 100.00 | — | 34.00 |
| Methacrylic Acid | — | — | 2.00 |
| n-Butyl Acrylate | — | 50.0 | 64.00 |
| Vinyl Acetate | — | 50.0 | — |
| Reactor Size | 12 oz. | 12 oz. | 12 oz. |
| Polymerization Temp. (°C.) | 65 | 65 | 65 |
| $(D_p/D_i)^2$ | 1.30 | 1.31 | 1.32 |
| S | 140 | 142 | 140 |
| N | 89 | 88 | 83 |
| Predicted y* | 1 | 1 | 1 |
| Experimental y | 1 | 0.9 | 1 |

*Predicted from Figure 1 using the applicable $(D_p/D_i)^2$ value.

TABLE I (b)

| Example | 13 | 14 | 15 | 16 |
|---|---|---|---|---|
| Seed of example | 6 | 6 | 7 | 7 |
| Ingredients: | | | | |
| Seed | 367.18 | 121.67 | 74.19 | 74.19 |
| K$_2$S$_2$O$_8$ | 0.38 | 0.23 | 0.21 | 0.21 |
| Dodecyl Mercaptan | — | — | 0.20 | 0.20 |
| De-ionized Water | 129.18 | 160.58 | 95.34 | 96.69 |
| Siponate DS-10 (94.1% active) | — | — | 1.06 | 0.23 |
| Siponate DS-10 (91.1% active) | 0.68 | 0.30 | — | — |
| Triton X-100 | 1.80 | 1.84 | 3.12 | 2.60 |
| Methyl Methacrylate | 100.00 | 100.00 | 23.00 | 23.00 |
| Methacrylic Acid | — | — | 2.00 | 2.00 |
| n-Butyl Acrylate | — | — | 75.00 | 75.00 |
| Reactor Size | 12 oz. | 12 oz. | 12 oz. | 12 oz. |
| Polymerization Temp. (°C.) | 65 | 65 | 65 | 65 |
| $(D_p/D_i)^2$ | 1.30 | 1.91 | 2.55 | 2.55 |
| S | 140 | 230 | 451 | 308 |
| N | 89 | 93 | 78 | 93 |
| Predicted y | 1 | 1 | 0.7 | 1 |
| Experimental y | 1 | 1 | 0.8 | 1 |

TABLE I (c)

| Example | 17 | 18 | 19 | 20 |
|---|---|---|---|---|
| Seed of example | 6 | 8 | 9 | 9 |
| Ingredients: | | | | |

TABLE I (c)-continued

| Example | 17 | 18 | 19 | 20 |
|---|---|---|---|---|
| Seed | 121.67 | 170.70 | 98.91 | 98.91 |
| $K_2S_2O_8$ | 0.38 | 0.28 | 0.27 | 0.27 |
| Dodecyl Mercaptan | — | 0.20 | — | — |
| De-ionized Water | 118.58 | 86.88 | 133.49 | 133.64 |
| Siponate DS-10 (94.1% active) | — | 0.36 | 0.07 | 0.27 |
| Siponate DS-10 (91.1% active) | .35 | — | — | — |
| Triton X-100 | 2.16 | 0.78 | 0.61 | 0.26 |
| Styrene | 25.00 | — | — | — |
| Methyl Methacrylate | — | 33.00 | 66.30 | 66.30 |
| Methacrylic Acid | 2.00 | 2.00 | — | — |
| Ethyl Acrylate | — | — | 33.70 | 33.70 |
| n-Butyl Acrylate | 70.00 | 65.00 | — | — |
| 1,6-Hexanediol Diacrylate | 3.00 | — | — | — |
| Reactor Size | 5 liter | 5 liter | 12 oz. | 12 oz. |
| Polymerization Temp. (°C.) | 65–85 | 72–75 | 65 | 65 |
| $(D_p/D_i)^2$ | 2.01 | 1.75 | 2.52 | 2.52 |
| S | 229 | 165 | 262 | 275 |
| N | 91 | 86 | 90 | 50 |
| Predicted y | 1 | 1 | 1 | 0.7 |
| Experimental y | 1 | 1 | 1 | 0.6 |

We claim:

1. An improved emulsion polymerization process for producing large particle size emulsion polymer particles wherein the improvement comprises:

providing substantially monodispersed polymer seed particles between 500 Å and 8,000 Å and having a Dw/Dn of between about 1.0 and 1.1 wherein Dw is the particle weight average diameter and Dn is the particle number average diameter, said polymer seed particles being a homopolymer or copolymer containing a polymerized monomer selected from styrene, acrylate, or methacrylate;

increasing the size of said polymer seed particles by polymerizing ethylenically unsaturated second stage monomers selected from styrene, alkyl acrylates, alkyl methacrylates, vinyl acetate, acrylic acid, and methacrylic acid onto said polymer seed particles in the presence of surfactants consisting essentially of non-ionic and anionic surfactants comprising by weight between about 30% and 98% non-ionic surfactant, said surfactant being present in the second stage processing sufficient to provide between about 105% and 1000% of theoretical polymer seed coverage to produce polymer particles containing by weight between about 5% and 95% polymerized second stage monomers.

2. The process of claim 1 wherein the polymer seed particles are a copolymer of said polymerized monomer copolymerized with ethylenically unsaturated monomers, and said polymer particles contain between about 20% and 80% by weight of polymerized second stage monomers.

3. The process of claim 1 wherein the polymer seed particles are a homopolymer of styrene.

4. The process of claim 1 wherein the polymer seed particles are a homopolymer of acrylate monomer.

5. The process of claim 1 wherein the polymer seed particles are a homopolymer of methacrylate monomer.

6. The process of claim 1 wherein the second stage polymer is a homopolymer of styrene.

7. The process of claim 1 wherein the second stage polymer is a homopolymer of acrylate monomer.

8. The process of claim 1 wherein the second stage polymer is a homopolymer of methacrylate monomer.

9. The process of claim 1 wherein the surfactants in the second stage processing provide between about 105% and 500% surface coverage of said polymer seed particles.

10. The process of claim 1 wherein the surfactants in the second stage processing provide between about 105% and 350% surfactant coverage of said seed particles, and the second stage polymerization of said ethylenically unsaturated monomers is substantially free of producing second stage new polymer particles whereby substantially all composite large polymer particles are produced.

* * * * *